(12) United States Patent
Stephan

(10) Patent No.: US 6,192,117 B1
(45) Date of Patent: Feb. 20, 2001

(54) TELEPHONE CALLING CARD WITH ENHANCED FEATURES

(76) Inventor: Anna Stephan, 800 Gessner Suite 1230, Houston, TX (US) 77024

(*) Notice: Under 35 U.S.C. 154(b), the term of this patent shall be extended for 0 days.

(21) Appl. No.: 09/231,510

(22) Filed: Jan. 14, 1999

(51) Int. Cl.[7] ............................... H04M 17/00; H04M 1/64
(52) U.S. Cl. ................... 379/144; 379/88.12; 379/88.19; 379/88.25
(58) Field of Search ........................ 379/114, 144, 379/130, 112, 115, 91.01, 88.08, 88.12, 88.18, 88.19, 88.22, 88.25; 455/405, 406

(56) References Cited

U.S. PATENT DOCUMENTS

| | | | |
|---|---|---|---|
| 5,592,537 | * 1/1997 | Moen | 379/144 |
| 5,640,447 | * 6/1997 | Fonseca | 379/144 |
| 5,719,926 | * 2/1998 | Hill | 379/144 |
| 5,825,863 | * 10/1998 | Walker | 379/144 |
| 5,864,609 | * 1/1999 | Cross et al. | 379/114 |
| 5,909,486 | * 6/1999 | Walker et al. | 379/144 |
| 5,915,007 | * 6/1999 | Klapka | 379/144 |
| 5,923,734 | * 7/1999 | Taskett | 379/144 |
| 6,028,920 | * 2/2000 | Carson | 379/144 |

FOREIGN PATENT DOCUMENTS

| | | | |
|---|---|---|---|
| 626774-A1 | * 8/1992 | (GB) | 379/144 |
| 0125569 | * 8/1982 | (JP) | 379/144 |
| 0311656 | * 12/1989 | (JP) | 379/144 |
| 0125567 | * 8/1992 | (JP) | 379/144 |

* cited by examiner

*Primary Examiner*—Curtis A. Kuntz
*Assistant Examiner*—Rexford N Barnie
(74) *Attorney, Agent, or Firm*—Felsman, Bradley, Vaden, Gunter & Dillon, L.L.P.

(57) ABSTRACT

A method and apparatus for implementing a business card having a calling card feature are provided. In conjunction with a long distance switch and a suitable toll measuring computer equipped with an appropriate memory, a number of cards can be given out by a publisher of business cards to a variety of recipients. Each recipient is typically provided with a unique PIN which can be used for calling a toll free number. This number is called, the PIN number is loaded, and then a long distance call is placed at no charge to the recipient. By use of appropriate individual PIN associated data and appropriate seasonal reloads of the time available and still to be used with each PIN, the recipient is encouraged to call time and time again so that the recipient builds into his own memory and retains in that memory the name of the person or business or service provider who has given him this gratuity.

7 Claims, 3 Drawing Sheets

FIG.1
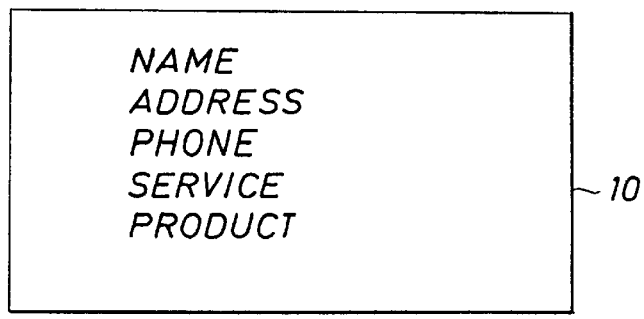
FIG.2
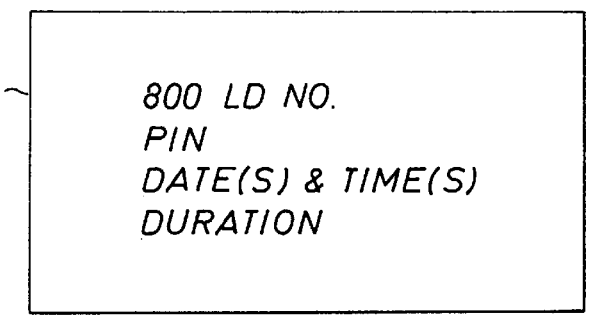
FIG.3
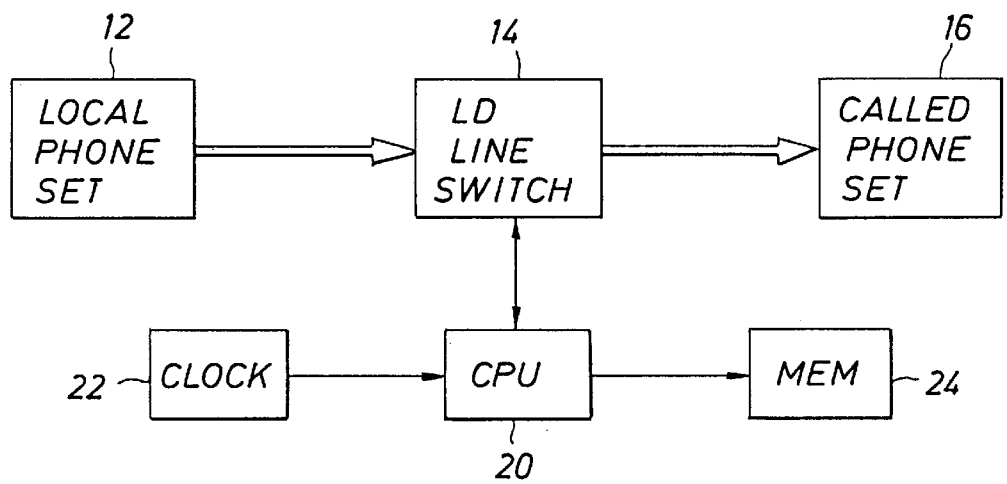
FIG.4
| NAME | PIN | INITIAL T | REMAINING T | SPECIAL T |
|------|-----|-----------|-------------|-----------|
| TOM  | 1   | 30        | 24          | 5         |
| SAM  | 2   | 20        | 17          | 5         |
| ANN  | 3   | 30        | 30          | 5         |
| ---- |     |           |             |           |
|      | N   | M         | M - t       | T'        |

TELEPHONE CALLING CARD WITH ENHANCED FEATURES

BACKGROUND OF THE DISCLOSURE

The present disclosure is directed to a telephone calling card and in particular to a telephone calling card that has an enhanced set of features. A large portion of the public now uses telephone calling cards. The popularity of the telephone calling card in part relates to the convenience of calling so that the person possessing the calling card can make calls at any telephone in the vicinity where they work or live. Most telephone subscriber systems operate on the basis that a call is placed from a residence or business phone only by the owner, and strangers do not have the right to run up telephone bills on that telephone subscriber. This apparatus accommodates that kind of problem. Thus, a person can carry this telephone calling card with them and make calls from pay phones, phones at other locations, and utilize the telephone calling card for their transmission. That is an important sense of freedom and liberty for the user. Moreover, telephone calling cards find greatest value for a more mobile society as we have now achieved.

Telephone calling cards are now often used as envelope stuffers and token enticements to attract attention. For instance, telephone calling cards are placed in an envelope with advertising to prompt a person to make an inquiry regarding a particular product. It is not uncommon to do this especially with a view of attracting business to the distributor of the calling cards. Such telephone calling cards typically have a small charge on them, and by that, the term "charge" does not refer to cost but refers primarily to the time available. Such a typical card will be charged to the extent of ten minutes, twenty minutes or much more LD time in the Continental U.S. Such cards can be set up so that they exclude certain area codes and include others. For that matter, telephone calling cards can be set up so that they include certain country codes and exclude other country codes. For instance, it is possible to set up a telephone calling card which includes all of Canada and Alaska, but excludes other countries. On the other hand, a telephone calling card can be established which permits calling to Western Europe, but no where else. Another example is a telephone calling card which can call only inside the lower forty-eight states.

The present disclosure is directed to a telephone calling card which is a business card having a personal name, address and phone number on the face. Such cards may include a job title and name of the business also. Most business cards are printed in bulk, distributed and soon forgotten. For the person who actually gets and keeps a business card it will be used one or two, perhaps three times and then be lost in the stack with other business cards or shuffled to a bottom of a deck of similar cards. Loose, unsorted, randomly organized stacks of business cards are not terribly beneficial; a business card which is copied onto a Roladex (card index) might be slightly more useful, but not every business card recipient is that organized. The present disclosure sets out a business card which includes the printed instructions for a telephone calling card on the back. This procedure enables a business person such as a salesman (selling for example new cars, real estate and so on) to hand out their business card and to assure that it is evaluated as a business card and that there is some memory retention in the mind of the recipient. By incorporating in the business card the described features of a telephone calling card, the business card then is promoted to the head of the deck so to speak, surpassing the significance of other cards in the stack.

The business card of the present disclosure has that benefit. Moreover, the business card of the present disclosure encourages the recipient to look keenly for the business card every time a call is made. More will be noted concerning that in the description below. The recipient of this business card has good cause to keep the card handy and in close view. By appropriate reading of the telephone calling card, long distance calls are authorized at a time, in a place, in choosing of the business card publisher. That is, the business advertised on the card has every reason to continue to distribute this card and look for favorable impressions with the recipient. This will be explained in detail below. This however involves the interplay or memory retention of the business name on the face of the card which recollection is enhanced each time it is handled. If the card is handled only once, the recipient of the card may, but probably will not, remember the name of the business on the card. If handled two or three times, the memory reinforcement is built up. If handled five to ten times, the probability of recollection of that business name will be increased to about 100% for practically ever recipient. In commercial circumstances, this means that the recipient will (with repetition) build up a recollection with a fond and favorable outlook on the business identified with the calling card. So to speak, a single calling card handled only once gets lost in the multitude of other calling cards which are pushed on every person receiving business cards. This repetition changes the image and builds reinforcement. This repetition enhances the ability of the business card recipient to remember that particular name and to identify that particular name. Consider this typical example. A business card is handed out, listing on the face of the business card some sort of name and address information. Often, the product or the nature of the services provided by the card publisher will be included. Those services or products may not be needed by the recipient that day, but perhaps later. For instance, when someone has a business card for a medical doctor, they may not need medical services because they are well and feeling good. The time will come when they do not feel well. If they do not already have a connection with a medical practitioner, the name on the card will then be recalled, and that professional service provider will then come to the front of their mind. Obviously, when medical services are needed, other service providers and product vendors will be momentarily pushed aside in the mind of the person needing medical services. The fact that medical services are needed will take paramount ascendancy over other needs of the moment. On another day, however, when the person is feeling better and medical services are not required, they may then determine that they need car repair services, purchase automotive tires and so on. Any number of other goods and services will then come to mind. It is in this kind of chaotic recollection of provider names (of a great variety of goods and services) that the business card recipient will think now and then of those service providers and seek them out.

The person who provides the business card in accordance with the present disclosure stands a much greater chance of being called. In other words, the business card which they hand out will have greater retention, and build a more easily recalled image in the mind of the recipient. The name will be more easily recalled because it has become distinguished from the crowd by comparable service providers. The person will be more aptly important to the affairs and circumstances of the moment to the recipient. Examples will be given below which illustrate how this occurs. Moreover, these examples will help build a clear and careful representation of how the present invention is effective to convert a very ordinary business card into a standout presentation to the recipient, one which is memorable and remembered.

There is the risk that the business card of the present disclosure can become an excessively expensive financial drain. The present disclosure sets forth a method and apparatus by which the business card of the present disclosure is not excessively costly. Consider the following example. Assume that the business card is given to a recipient. The recipient is provided with a 800 toll free line to call to thereby start placing telephone calls. The calling card feature is implemented by calling the 800 toll free number and then inputting a personal identification number (PIN). Unbeknown to the business card recipient, when the PIN is input, procedures are set into effect which benefit the recipient but which also enable the recipient to be tagged or prompted either directly over the telephone line or by means of a follow-up contact from the distributor of the business card. Examples of this will be give below. In one aspect, the calling card can be recharged periodically. By periodically charging the card, the recipient will take advantage of that to place calls, and each occasion, by appropriate spacing, can then be an occasion at which the recipient is given greater emphasis and greater encouragement to remember and view favorably the person who provided the business card to them.

In one aspect to the present disclosure, it cooperates with a LD switch connected with a computer. The computer stores an input account number associated with the PIN of the card holder, and that PIN account is accessed from use to use. With each use, the time remaining on the card is decremented until it reaches some minimal value or zero as the case may be. Moreover, it can be charged and recharged periodically. This enables the gift of a free LD call to the recipient, and the timing, spacing, and duration of that call can be tailored so that the calling party will take abundant notice of the sources of the gift. As will be detailed, the business card account associated with the LD switch can be periodically incremented to provide seasonal input of added time. This can be done as it were at the wholesale level so that the business card publisher will be able to obtain a large block of available time, but can obtain that at the lowest possible cost, loosely speaking, a cost which will be deemed a wholesale cost. In another aspect, the PIN can be used as a trigger to prompt a personally recorded message to the PIN user so that they are told some news that will prompt them to call again in the future. That contributes to the reinforcement and that will be exemplified in some detail below.

BRIEF SUMMARY OF THE PRESENT DISCLOSURE

This disclosure sets out a method and apparatus for implementing a business card having a calling card feature. In conjunction with an LD switch and a suitable toll measuring computer equipped with an appropriate memory, a number of cards can be given out by a publisher of business cards to a variety of recipients. Each recipient is typically provided with a unique PIN which can be used on calling an 800 toll free number. As a preliminary, this number is called, the PIN number is loaded, and then an LD call is placed at no charge to the recipient. By use of appropriate individual PIN associated data and appropriate seasonal reloads of the time available and still to be used with each PIN, the recipient is encouraged to call time and time again so that the recipient builds into their own memory and retains in that memory the name of the person or business or service provider who has given them this gratuity. Effectively, the publisher will become the favored source of that particular service or product provided by the business card publisher. The business card of the present disclosure is a favor or gift, on the one hand, and yet it is a type of memory reinforcement device which, at the depletion of the calling card time available for LD services, becomes significant to the card recipient. Variations in the use of this will be set forth.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is the front view of the business card of the present disclosure including exemplary data;

FIG. 2 is a back view of the business card of FIG. 1 showing exemplary data cooperative with a calling card feature;

FIG. 3 is a block diagram schematic of a telephone system suitable for use with the business card of the present disclosure;

FIG. 4 is a representative table of data which is stored in memory cooperative with the telephone calling card of multiple users for multiple purposes;

DETAILED DESCRIPTION OF THE PREFERRED EMBODIMENT

Figure 5:
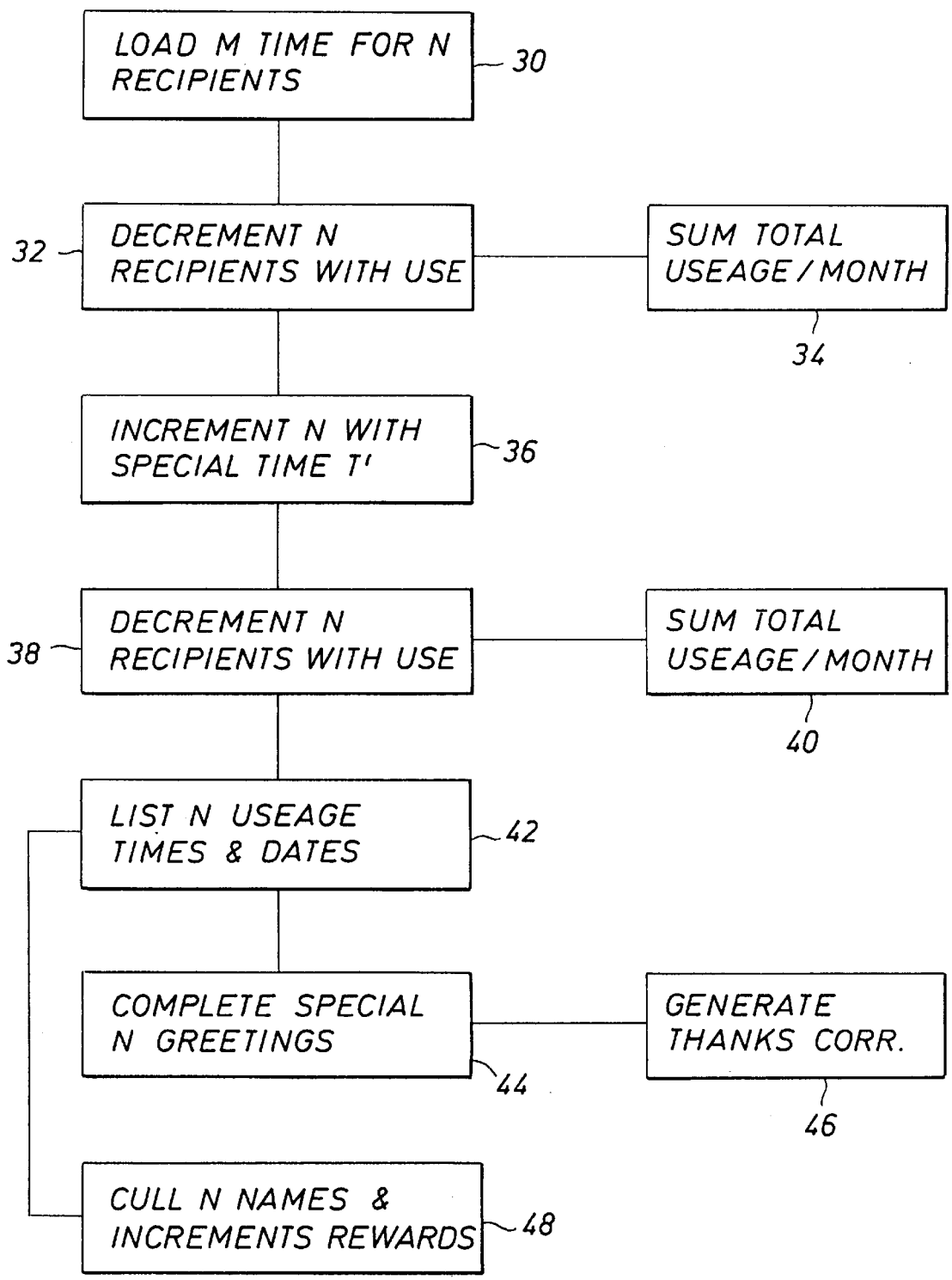
FIG. 5 is a block diagram schematic showing a sequence of events in one method of using the telephone calling card of the present disclosure.

Attention is first directed to FIG. 1 of the drawings. FIG. 1 shows the front face of a business card 10. The business card typically includes name, address, phone number, service or product identification. The name is the name of the business card provider. That can be the name of an organization but it can just as easily be the name of an individual. Or, it can be both. As an example, the name may be Dr. Sam Smith, and the organization could be the name of the clinic where Smith practices medicine, dentistry and so on. The address typically can be the P.O. Box or street address, or both. Whether it is the mailing or physical address, appropriate address identification is provided to enable easy contact. The phone number typically can include the area code and local telephone number, or perhaps the fax number. In the alternative, a page number can be given as well as an internet address. The card 10 will commonly list the service which the provider renders, such as dental services. Sometimes, rather than a service, a product will be identified. The product can be a particular brand of automobiles. All the data exemplified above is typically on the face of the business card 10 illustrated in FIG. 1.

FIG. 2 shows the flip or backface of the card. FIG. 2 shows that the card includes an 800 LD (toll free) number. This is the number which is called to get into the LD switch discussed below. This is the 800 number that is necessary to start the process. An example will be given below to flesh out this example and explanation. FIG. 2 also shows that the backside of the card includes the PIN for that particular recipient. The back may optionally include a date and time at which the card can be used. Last of all, it is desirable to include authorized LD duration printed or otherwise indicated on the back of the card. Consider as an example a person on the east coast in area code 212 (Manhattan Island) calling someone in Los Angeles which is area code 213. The call is placed by first calling the 800 number for the LD switch. Then, at the appropriate instance and on the appropriate prompt from the LD switch, the PIN is input. The PIN can have any length. For instance, it can be as short as three digits or so, but it typically will be 5 to 8 digits. This depends of course on how many people access this particular 800 number. More will be noted about the allocation of the 800 number and the set of PINs affiliated with a particular 800 number. Then, the called number in area code 213 is input. The sequence of digits thus comprises the 800 LD number, PIN, and called number. That set of data is input to the LD switch and is observed by the switch and is recorded in the computer. That gives rise to creation of appropriate dates, time and duration for that particular calling person, and sets up certain recipient tracking data to be discussed.

FIG. 3 of the drawings shows in rough outline the deployment of the equipment in conjunction with the calling phone selected by the recipient. One must assume that the calling phone is simply a phone handy to the recipient. This enables the recipient to use any local telephone set to dial up the 800 number for this particular LD service. Again, examples will be given of that below.

Attention is next directed to FIG. 3 drawings which shows a very simple representation of this sequence of events. Assume for purposes of discussion that the recipient of the business card 10 decides to make a call. Using a local phone set 12, the 800 number for the LD service is called. Effectively, this will route through local telephone switch gear and makes a telephonic connection to the LD line switch. While the switch may be physically located in the same city or elsewhere, the switch 14 is accessed by the appropriate 800 number. Then, the recipient will input their PIN and called phone number, ultimately resulting in a call which is placed to the called phone set 16. This works of course using land lines in all instances, but it will also work using a mix of land lines, microwave transmission, satellite links, and cellular phone connections. In any event, all of this is carried out in the common fashion which is a well established procedure. While the recipient will simply experience a conventional telephone call, and will make connection which is presumed to be answered at the phone set 16 they will carry on a conversation of a few minutes or several minutes. In addition to that sequence, the following steps are carried out in the background. The CPU 20 operates in the programmed fashion to capture the data of the call which has been placed. Typically, this is at least the PIN and called phone number. By cooperative operation with a clock 22, the date and time of day is also captured. All of this data is input to memory 24. Organization of the memory and incrementing or decrementing of memory data will be discussed in detail later. In addition to that sequence, the following steps are carried out in the background. Prior to connecting the call to phone set 16, the CPU 20 (calling card platform) will verify the PIN number and the minutes available to the caller. Once satisfied that these data are correct, the CPU 20 will advise the caller of the time allocated/remaining for him and simultaneously will instruct the switch 14 to complete the connection of the call. By cooperative operation with a clock 22, the date, the time of day and the duration of the call is captured. The CPU 20 will input this data to memory 24. The records related to that PIN is updated immediately to reflect the information related to business card 10. If the call lasted more than the time allocated to business card 10, the CPU 20 will immediately instruct the LD switch 14 to terminate the call with some sort of interruption signal, etc.

Developing this thought, assume that the call occurs on a certain day at 10 AM and lasts for 10 minutes. Data will be transferred into the memory 24 which identifies the calling person using their PIN, and the account of that person will be decremented by the requisite time interval or 10 minutes in this example. Organization of the data in the memory should now be considered. Several examples will be developed regarding the handling of several recipients of the card 10. This is done in FIG. 4 of the drawings and building on that.

Attention is now directed to FIG. 4 of the drawings. This shows a representative set of entries which are input to the memory 24. In the first column, there is an entry for a customer or recipient name. Three exemplary names are included which are Tom, Sam and Ann. Arbitrarily, they have selected unique numbers which are 1, 2, and 3, these being selected from a set of N PINs. Arbitrarily, each is provided with an initial charge of time represented by the symbol T. Assume for purposes of discussion that the time is 30 minutes for Tom, 20 minutes for Sam and 30 minutes for Ann. Again, the initial charge of time is represented by the symbol M. Assume that all this data is stored in appropriate database relationships in the memory 24. Thus, the entries for Ann will include her particular PIN and the initial time which is input to the M register for her. The time remaining is given by the symbol M-t or the time remaining for Ann is 30 minutes. This assumes that none of the time has been used while the other recipients illustrated in FIG. 4 have used some of their initial time. Last of all, there is a special input column which is incremented as will be explained. This is represented by the symbol T'. The special time is placed in a particular column and can be either added to the initial time or can be input at a special time with a special time and date for its use. Examples will be given. Now, the representative data which is shown in the columns in FIG. 4 is collected and held in the memory 24. The memory 24 is dynamic and changes are made in this memory as they occur. For instance, a new recipient such as Don might be added later. Don will be given an initial charge of time M and will be also assigned the unique N for the appropriate registers. The date of entry is arguably stored. These can be placed in another column (not shown) to keep track of the date of entry. If need be, additional columns can be allocated for every recipient. For instance, if the initial charge is 100 minutes, one must presume that this charge of 100 minutes of LD services will be used on a number of occasions. The time and date of each incremental withdraw of time can be stored. Thus, with a column, the date of entry of the name Tom is stored, then several columns such as $C_1$, $C_2$...$C_n$ are created. Each call can be recorded with the date, and if desired, the duration of that call and the called number. Patterns will develop in that to be described.

With the view of enhancing the favorable impression and the ability of each card publisher to nail down the data proving this, the procedure of FIG. 5 is best used. Considering this with FIG. 4, assume that the publisher of the business card 10 distributes 100 of these cards to 100 named recipients. The names, addresses, and other personal data are loaded into appropriate registers, following the pattern of FIG. 4, and each is assigned their unique PIN. If desired, the date and time of loading can also be incorporated. All of this is shown in FIG. 5 as the step 30. It will be assumed that each of the N recipients is provided with M time. Without any specific limitations on the time, date, and duration of call, the business cards will typically be used to place LD calls that are authorized. With each occurrence, the time, date, and duration is captured. This results in the decrementing of the available time for each user, and that prompts the memory 24 to store the remaining time represented by the symbol M-t. This step is carried out at 32. Assume that this occurs over an interval of one calendar month. For billing purposes, the total time actually used is summed and a bill is generated based on usage for the month. This is shown as the step 34, and the card publisher is provided with the bill generated at the step 34. Sufficient credit or initial bond provisions are used to assure that the proper payment is made. However, and it is important to note, this payment can be made promptly and in bulk so that the cost is a wholesale cost. This can result in a reduction of 25%–35% compared with the individual subscriber rate which would otherwise be obligated to the N users. They get the benefit of free time and in their mind, they see that as having a value based on the retail value of LD calls. In fact, since they are billed in bulk at the step 34, effectively, that is a wholesale charge. The recipient information is input prior to delivering the business cards 10. The publisher of the business card 10 will agree in advance how many minutes should be assigned to each business card. These minutes are set in advance, loaded into the CPU 20 and are noted on the face of the card. These business cards are also set for usage within a period of time from the date delivered to the publisher of the business card 10, for example 3 months, six months, etc. (the business cards will display on the back the expire date). The cost for the business cards that are delivered to the publisher of the business card 10 are on delivery (in advance). In this option, unless the publisher of the business card 10 requests in advance, no details of the recipients use of the card is maintained.

If products and/or services are not listed on the face of the card, on dialing the 800 number display on the back of the card, a message is incorporated to bring the attention of the card user to the products and/or services provided by the Company. The message could be changed as often as needed to reflect changes in the product and services. The message could reflect products and services for an upcoming occasion or events, e.g. Roth IRA at the tax season, interest rates changes for mortgage brokers, etc.

Assume that a special time of the year occurs. This can be tied to the common calendar or it can be done on the initiative of the calling card publisher. The step 36 reflects this. Assume a synchronized campaign is launched by the calling card publisher. This campaign can be tied to the seasons of the year or can be arbitrary in other aspects. For instance, it is possible to simply provide the special time T' to every one of the N users on the 15th day of each month. A more imaginative alternative, however, is to tie it to the seasons of the year, for instance, each account can be incremented with 5 minutes used between December 20th and December 25th to help recipients celebrate Christmas by calling long distance to some family member. Then, in February, it can be incremented by an additional 5 minutes tied to some holiday including February 14th for the celebration of St. Valentine's Day. Another 5 minutes can be added in the week of Mother's Day and so on. Summer sequences can be incremented using the Memorial Day weekend, July 4th and Labor Day, to pick another set. Preferably, they are spaced about one month apart and are all filled with the same interval so that each of the N recipients will be able to make that special call at that special season.

After three or four calls are made by the recipient, the recipient should have better fixed in their own mind the information on the face of the card 10 exemplified in FIG. 1. This will reinforce the recollection and the sense of gratitude that the recipient has towards the calling card publisher. This is accomplished at the step 36.

Assuming any of the examples listed above, with a special week or season of the year provided with its own special time T', the recipients will then use that time and their particular accounts will be decremented, see step 38. All of this time will be totaled and again the step 40 shows how that time is summed to provide a bill or charge for the time intervals in the one month. A bill is generated and the bill is then set to the publisher of the business card 10.

At the end of an advertising campaign such as the distribution of 100 of the cards 10, the publisher then interrogates the CPU 20 to obtain a list of usage, times, and dates for the N recipients, see step 42. Probably, it is not necessary for the publisher to ask for the phone number called or any other information like that. While that might be available, the more important purpose is to determine whether or not the N recipients were in fact taking advantage of the calling card 10. If so, all that time and data can then be captured and tabulated for each of the N recipients. If that is done then this list of times and dates will typically be sufficient in detail to illustrate the value of the calling cards. This value can be ascertained on a careful review of these entries obtained from the step 42.

At the step 44, and knowing that the calling card 10 has been used by many in the list, it is possible to compile a special greeting for some, perhaps each one of the recipients. Consider that Tom has placed the calls at the times and seasons suggested for the special events. These special times including calls using the amount of time T' can be tabulated. Then, a special greeting can be prepared just for Tom. This greeting is stored in the memory 24, but that special greeting is retrieved when Tom enters the 800 phone number with his personalized PIN, at which time the greetings can call Tom by name and remind him the value and benefits of this. The step 44 thus can be a simple greeting, something to the effect of: "Thanks, Tom for using our service. Do not forget this has been brought to you by . . . ".

As an alternative, after compiling the list at 42, which includes the times and dates of usage for each of the users, it is possible to generate correspondence to offer thanks. This is the step 46. It differs from the step 44 in that the step 46 is accomplished in print while the step 44 is an oral transaction. This can be done using the computer 20.

The step 42 compiles a list of the recipients by PIN and usage. Optionally, it includes the times and dates of a specific usage. This list can be broken down into two separate lists, a list of those that might be called as represented at the step 48. While those might be deleted, because the cards 10 are not being used or for other reasons, the list of those not called can be used to generate the special greetings at the step 44 and the correspondence at step 46. One factor that is helpful in this procedure is accomplished by regrouping the list into two or three different levels. For instance, this may depend on the usage of the goods or services of the business card publisher. The publisher may deal in goods or services which can be used a lot or a little by those who are interested. This can be done easily by grouping those on the list generated at 42 into high priority clients or customers and low priority clients or customers. Applying the procedural steps of FIG. 5, a procedure is set forth which can be executed on a daily basis, perhaps on a weekly basis, or as seldom as once per year. Consider the example of a service provider who has a seasonal business. Consider a CPA who has tax intensive practice which involves a large number of tax clients who require tax returns to be filed by April 15, or where extended, by August 15th of the year following. For that publisher, they might want to attract new business up through the end of January. After that, new business is not particularly welcome because the business is seasonal and the rush occurs from early in January on through to April 15th, and with a deferred large increment of business near the end of the summer. That person might wish to pass out their business cards in the summer and fall. Assume, for instance, that they acquire 500 business cards which have the 800 LD number and PIN numbers on them (see FIG. 2) for prospective recipients 1–500. In this instance, N equals 500. Assume that these cards are passed out, and the appropriate data is entered. That is, the computer shown in FIG. 3 is used to store the name, address, and other data pertinent to each recipient. Then, to prompt and give reminders, the business card 10 (each having a PIN on the back) are passed out in the late summer and early fall to friends, neighbors and acquaintances of the CPA. Assume that all 500 are passed out and in the hands of recipients during August of the year preceding. Each card might provide for 30 minutes of LD time spread over the time interval of September 1 through January 31, an interval of 5 months. In addition to that, in advance of each holiday season, the publisher could readily provide an additional 5 minutes tied to 3, 4, or 5 holiday seasonal events. The seasonal events are the week of Labor Day (the first week of September), a week coincident with Columbus Day (the week of October 11), Thanksgiving week (the third Thursday in November), December 25 for the Christmas season, and a selected date in January which could be as early as January 15 (the birthday of Martin Luther King) or early in February (for instance at the start of Lent or some other comparable event). Then, as the N recipients use the time, the greetings would remind them of the upcoming holiday and the possibility of an added 5 minute interval for those holiday seasons. As those events are encountered, the telephonic greeting as suggested at step 44 would then call attention to the fact that the books, files, bank statements, and other financial records should be gathered. By repeating this message near the holiday occasions just exemplified, the 500 recipients will understand what they must do. Admittedly, some may and some may not do that, but the important things is that the business card of the present disclosure in conjunction with this message system gets the word to the 500 card recipients and calls them to action. While it is in the commercial interest of the card publisher to do so, it is also very much in the interest of the 500 recipients and they are urged to do something which they must deal with and must come to grips with in rapid order. Knowing the CPA and hearing the message, they will realize and know that they have to start on their tax return, and it cannot be readily put off from January all the way through to April 15.

For those who then bring in their tax returns, they can be deleted at the step 48. While they may still have time, and should not be deprived of accumulated LD time not yet used, there is no need to give them the message. There will be others who simply ignore the message for a whole tax season because they take their tax work elsewhere. They can be deleted all together. The list of 500 can then be changed and modified by making these insertions and deletions so that the same list (once 500) will become a shorter list for the next tax season, yet will still serve the same purpose. In all events, this is very helpful and assures that the tax professional gets the appropriate advertising out, gets the right message to the selected audience, and the audience is given a reminder to handle these essential chores. The calling card then becomes personalized. More than that, the calling card becomes an effective upfront timely reminder to take the appropriate papers to the tax professional and get the work started. That stands to benefit the tax professional by getting the work in earlier and it certainly benefits the 500 recipients because they must deal with the tax return problem.

Another prospective circumstance for use of this calling card 10 relates to a casualty insurance sales person. Typically, a family will acquire only 2 or 3 casualty insurance policies. While one might relate to the automobile, the other would be a general homeowner's policy which takes care of most household liability questions, a third policy might be an umbrella policy over all policies, or a specialty policy such as owner's of motor craft, air craft, those living in a flood plane, and so on. Assume for purpose of description that three policies have to be acquired by a typical homeowner. By giving the card 10 to the homeowner, and by loading the memory with the dates of the policies which require renewal, personalized reminders can be implemented. Consider as an example a person who has a homeowner's casualty insurance policy which covers all things relating to the building or premises where they reside and has a policy which is renewed annually and assume that it coincides with the calendar year. By contrast, this person may have a separate automobile policy which is renewed annually and the annual renewal date is sometime in the late spring. Knowing those dates, personalized messages for that particular person can be loaded. Prior to the January 1 renewal date, a message which is delivered to the recipient near Thanksgiving will serve as a first reminder. A Christmas week message will be almost too late, but it is sufficiently in time to jog the memory of the recipient. By utilizing personalized messages, unique for each individual recipient, the word can be delivered to them so that the greetings or message at the time that they call out on the LD service and it can be tailored precisely to their particular needs, even incorporating the date on which renewal must be accomplished. In the example given, if the policy must be renewed on January 1, it is a paramount urgency that the message be given prior to Christmas, and action be called for in the remaining few days of December so that the policy will be implemented and in place in proper time. This is a good example of the use of the present invention to make the calling card come to life through the calling card features, thereby elevating the business card of the present disclosure to give a desired message.

DATE OR EVENTS SPECIFIC REMOTE TRACKING PROCEDURE

Figure 6:
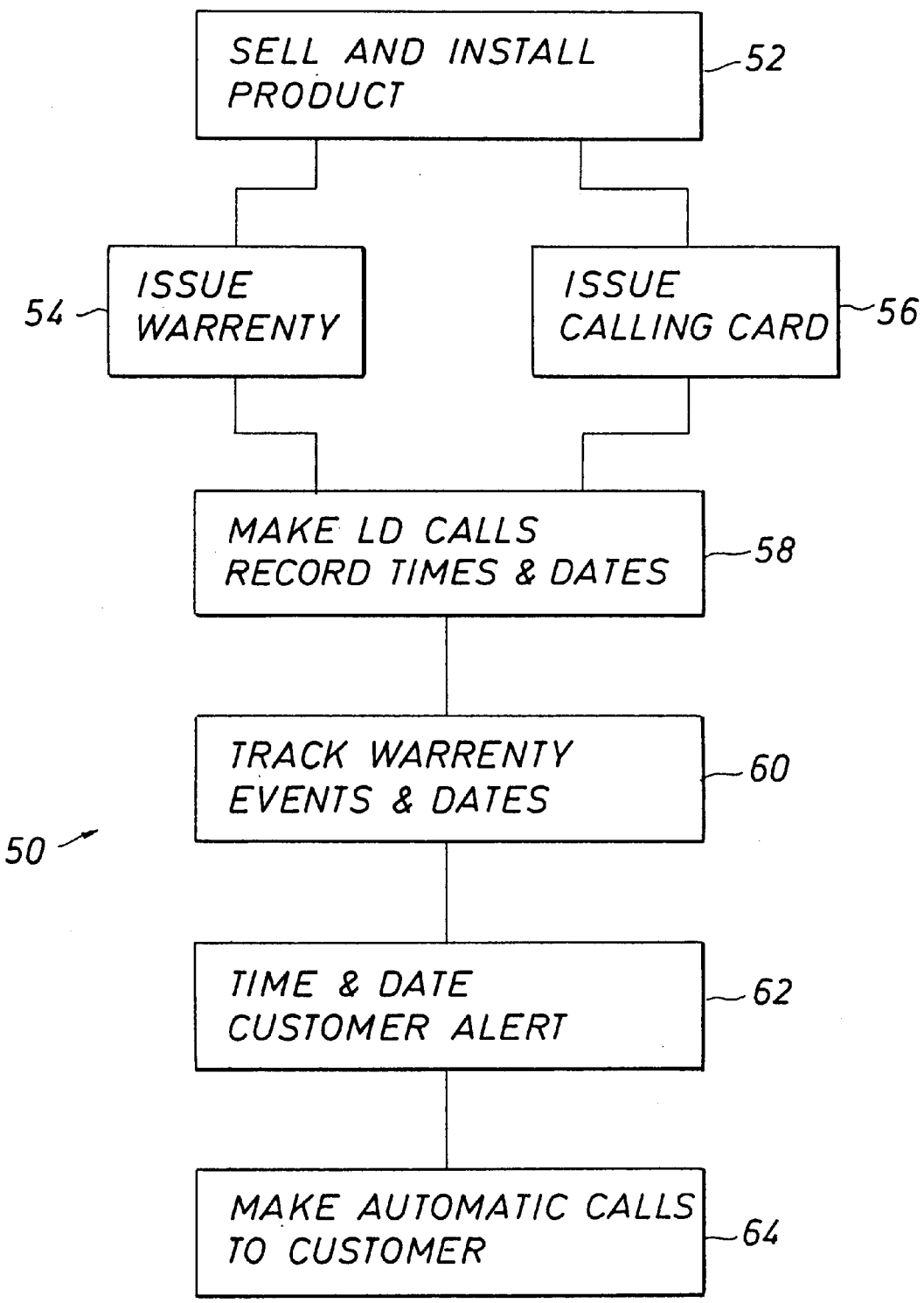
FIG. 6 is a block diagram schematic showing a sequence of events involved in one method of use of the telephone calling card of the present disclosure.

Going now to FIG. 6 of the drawings, the numeral 50 refers generally to a procedure for use with a remote tracking system. It is a tracking system which can be keyed either to dates or events, and some dates and some events which can be partially or wholly within the control of the customer. The context will be given in the concern with a typical automobile warranty. The automobile warranty is often stated in an alternative form. The only thing that is initially known is that the automobile is sold on a certain date with no mileage. In the sale of a new vehicle (and this can be applied to used cars by making the appropriate setoffs from the beginning), the only thing that is known is that it is sold on a specific date (by that, sales means delivery) and it has no mileage (or only two or three cumulative miles on the odometer). The warranty can be stated in terms of mileage such as a warranty for 50,000 miles. However, most warranties are stated in a combination arrangement, namely a warranty for four years or 50,000 miles, whichever occurs first. Moreover, the warranty is not absolute in that, the warranty will often require that certain maintenance steps be undertaken again, based on mileage, based on time of year, or based on dates. Typically, an automobile purchase is a very large financial undertaking for the owner. The same would be true of even larger items such as large pleasure boats, small aircraft and so on. Assume for the moment that the purchased item is a $30,000 automobile, and assume also that it requires at least four oil changes per year, meaning one for each season, and it also requires an annual inspection by the state, an event which can be tied to the date of purchase or is fixed on the state's calendar.

With this information, and defining the date of purchase as day zero, it is possible using the sequence of events at 50 in FIG. 6 to track the warranty and to assure that appropriate service is rendered. It is also possible to avoid warranty disqualification events such as a failure to change the lubricating oil. As shown in FIG. 6, the first step is the sale and installation of the product. The step 52 is typically carried out in this instance by delivery of the vehicle on day zero. The dealership or the manufacturer or some other responsible party will issue the warranty, this being step 54. In addition to that, the customer is issued the card 10 of FIG. 1 which on the face is a business card and which on the back side includes the instructions for the calling card. In this instance, assume that the anticipated calling card duration is going to be at least as long as the warranty so that the warranty duration is the minimum, and assume in this instance that the purchaser is given a calling card 10 good for 5 minutes per month for the next 50 months, thereby exceeding the duration of the warranty. On a basis determined by the car purchaser, the calling card is used time and time again at the rate of 50 months and for 5 minutes during each month. For that, the calling card 10 is issued as shown at the step 56. The recipient makes the LD calls at times and dates which are recorded, note the step 58. Sometimes, there is nothing at stake, and the telephone greeting will simply be a personalized greeting, some form of salutation to the recipient. However, the telephone greeting prior to connection of the LD call can often be a reminder to the recipient to track the events and dates tied to the warranty. The greeting may include the LD time left (e.g., 2 minutes and 40 seconds). This is shown at 60 where such events are input by the recipient. Consider three or four examples. Counting from the date of purchase, the recipient may be required to bring the car back in for a warranty check up after delivery, typically after about 1,000 miles or thirty days. They can be reminded of this in the first telephone greeting in the next month. As an example, the vehicle may require a change of lubricating oil every season; this can be measured counting off three months or 90 days from the date of purchase. This can be used to remind the recipient to bring the vehicle back in for the next lubrication oil change.

The telephone greeting can serve both as a reminder and also as an information gathering mechanism. For instance, the customer using the calling card 10 will call in to obtain the 5 minutes free time for any particular month and will receive a greeting which asks the current mileage on the vehicle. That mileage can be input using the standard key pad on a touch tone telephone. Thus, after three months, the customer may be reminded to take the car, obtain the appropriate lubrication, and indicate the date of lubrication and the mileage. This can be readily implemented by simply asking the date via automatic telephonic inquiry, this being part of the greetings, and also asking any other questions where the response is provided in the same fashion. This enables tracking of the warranty dates and events as shown at the step 60. Armed with the data which is input by the customer from the step 60, it is possible at different times to track the time and date of customer alert events which is the step 62. Such an event may be the need for an additional lubrication of the vehicle. It may be time for the annual inspection and that can be reminded to the customer. It may be time for periodic inspection which does not occur annually, but perhaps once every two years or three years, such as tire rotation, inspection of the exhaust system, and so on. It should be noted that on dialing the 800 number displayed on the back of the business card, a voice will greet the caller and will deliver the special message from the publisher. Thereafter, a voice instructing the caller to enter his PIN number. On entering the PIN number, a message is relayed to the user as to the balance of the time available to him. This message of the minutes available will be relayed to the caller each time the caller uses his card. Within the context of the calling business card, a melody may greet the caller and a message will be announced, i.e., the melody associated with specific company will replace the name of the company on dialing the 800 number. This is an "audio" product and/or service logo.

It is possible that the customer may forget, lose the calling card 10, or otherwise be out of touch. If need be, and upon measurement of appropriate events and dates with respect to the warranty obligation, it will be necessary as shown in the step 64 to make a periodic call to the customer. That can be done automatically, and the customer can then be reminded of the events that need to be checked or double checked, or the customer can be reminded that a certain portion of the warranty yet remains. Finally, because the warranty does actually expire after 48 months in the example, a call might be made to the customer after 47 months. All this telephone traffic is captured and recorded. Raw data which is input from the customer into the system is captured by using caller ID information. When programmed calls are made out to the calling card recipient, those are also documented. This helps hold down disputes and squabbles between the manufacturer and the recipient. This also helps keep in touch in case product recalls are necessary. It is always possible that the customer with the automobile might move to another location without providing a forwarding address. Through the use of this equipment, the time and date of customer initiated events can be tracked and recorded. Also, the number that the customer uses to make the calls from can be captured. While this is perhaps not as conclusive as obtaining an address for the customer who has just moved, it nevertheless is better than no information because it usually will connect with the home phone number and the customer, hence, the home address of the recipient can be identified.

In another aspect, the apparatus of the present disclosure is especially useful for obtaining assurances of preliminary warranty compliance. Warranties become null and void if no lubrication is done. Periodic lubrication obligations rest on the shoulders of the recipient, and are a means of disqualifying such warranty obligations. If these service milestones are not observed, the warranty can be voided, but this is an event which sometimes leads to disputes, and those disputes can be reduced by providing a warning in advanced.

Finally, the warranty policing system suggested in FIG. 6 can be applied to all sorts of interactive relationships between a vendor or manufacturer on the one hand and customer, consumer, recipient or other user on the other hand. For instance, service contracts which are tied to usage can be done in this fashion. It is necessary to periodically obtain the amount of use of some devices such as photocopy machines and the like. The service contract typically is not tied to days or miles, but to the number of copies actually made. Again, the foregoing sequence of events in FIG. 6 can be applied to this.

In some instances, the recipient PIN can be printed or coded in a magnetic strip for telephone sets capable of reading the strip, or both.

While the foregoing is directed to preferred embodiment, the scope thereof is determined by the claims which follow:

What is claimed is:

1. A method of issuing telephone calling cards comprising:
    (a) assigning a toll free number, and creating a unique PIN for a telephone calling card recipient;
    (b) issuing the telephone calling card to the recipient at the start of a commercial transaction extending over time involving the telephone card publisher and recipient;
    (c) incrementing a telephone calling card time register for the recipient to enable the recipient to place time measured LD telephone calls;
    (d) decrementing the time register for that recipient with use;
    (e) recording the date on which the recipient uses time in the calling card register; and
    (f) based on the dates of use of the telephone calling card as recorded in the register, and beginning with the commercial transaction between the recipient and publisher thereof, alerting the recipient in the telephonic transactions of desired future events.

2. The method of claim 1 including the step of obtaining telephonically conveyed information from the recipient on LD calls where such information relates to the commercial transaction.

3. The method of claim 1 wherein the commercial transaction is a warranty protected transaction and the warranty has a specified duration, and the method further tracks warranty related timed events, and the recipient inputs telephonic data enabling warranty tracking.

4. The method of claim 1 wherein the commercial event is an annual event, and including the steps of providing a telephonic salutation to the recipient connected to the annual event.

5. The method of claim 1 wherein the publisher selects recipients and assigns a PIN thereto, and transacts business therewith based on recipient furnished data during calls.

6. The method of claim 5 wherein the publisher donates the PIN and calling card to the recipient and tracks recipient related times or dates through telephonic use decrementing the recipient register.

7. The method of claim 6 including the step of placing a commercial transaction date in memory to enable data related events to be tracked by the publisher and followed by the recipient with dynamic updating.

* * * * *